April 23, 1929.  H. J. KAST  1,710,646

FLOAT BALL

Filed May 16, 1928

INVENTOR
Henry J. Kast
BY
ATTORNEYS

Patented Apr. 23, 1929.

1,710,646

UNITED STATES PATENT OFFICE.

HENRY J. KAST, OF WATERBURY, CONNECTICUT, ASSIGNOR TO SCOVILL MANUFACTURING COMPANY, OF WATERBURY, CONNECTICUT, A CORPORATION OF CONNECTICUT.

FLOAT BALL.

Application filed May 16, 1928. Serial No. 278,186.

This invention relates to float balls of the type particularly adapted for use in flush tanks for closets and similar fittings. As usually employed float balls of this type are connected in a suitable manner to one end of a rod which operates the valve mechanism of a ball cock to admit and automatically shut off the water supply to the tank when the tank is filled. The connection between the float ball and the rod is commonly made by a spud secured in the wall of the float ball and to which the rod is connected. Heretofore the common practice has been to puncture the wall of the float ball, to pass the spud into the apertured wall, and to secure the same in place in any one of a variety of ways. This practice resulted unsatisfactorily, inasmuch as the connections between the spud and the wall of the float ball tend to work loose and leak and eventually cause the float ball to be inoperative.

The object of my invention is to overcome these difficulties and inconveniences and in so doing to connect a spud or other member, for connection with the rod, in a position in the wall in a float ball in such a manner that the float ball is not punctured and therefore cannot leak, and a joint is made between the spud and the wall of the float ball in such a manner as to rigidly connect these members to one another.

To this end in carrying out the invention the float ball is preferably made of suitable sheet metal in the customary manner and is provided with an indentation forming a socket therein for the reception of a spud or a part thereof. The spud is set in position in the socket in the wall of the float ball and interiorly a washer, or other similar device, is employed in such a manner as to surround the spud or that portion thereof lying within the socket, with the wall of the depressed portion of the float ball intervening, and the parts then connected by means of a suitable press or other apparatus in such a manner that the metal forming part of the spud is spread to expand over a part of the washer to secure the parts together in a fixed joint which cannot leak.

Figure 1:
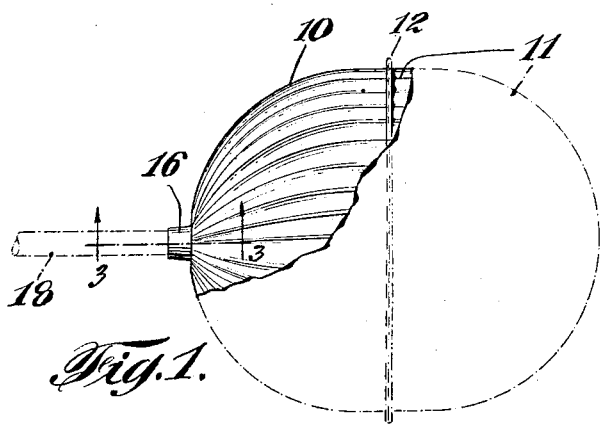
Figure 2:
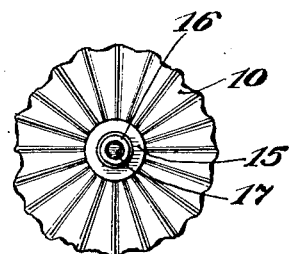
Figures 3, 5:
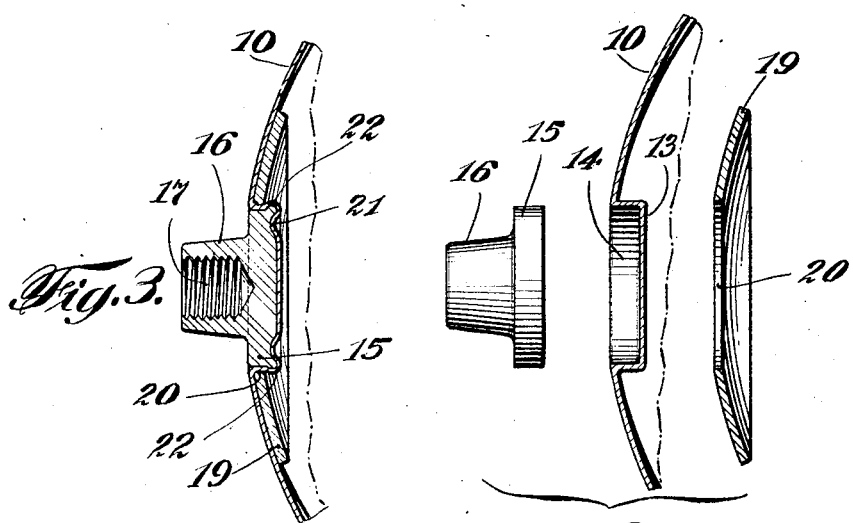
Figure 4:
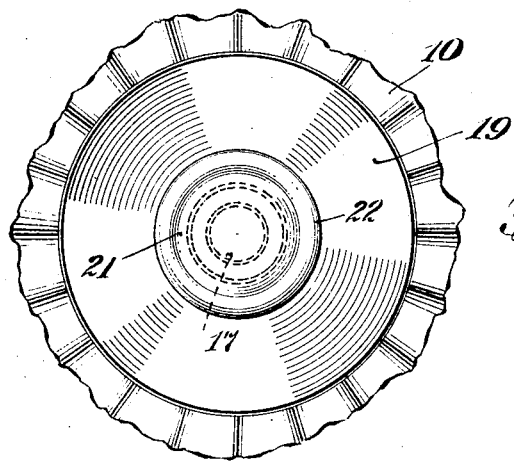

In the drawing Figure 1 is an elevation illustrating the type of float ball to which this invention relates, Fig. 2 is a partial end elevation of the same, Fig. 3 is an enlarged section on line 3—3, Fig. 1, Fig. 4 is an elevation of the parts shown in Fig. 3 looking at the interior thereof, and Fig. 5 is a view showing the parts of the float ball in their separated relationships.

In Fig. 1 of the drawing I have illustrated in elevation a portion of a float ball of the type to which the invention relates. The dotted lines illustrate the complete configuration of the float ball in elevation. This float ball is preferably made in two parts, indicated at 10 and 11 and constructed of a suitable sheet metal. These parts are similarly formed and may be corrugated or plain and are preferably flanged so as to be connected to one another at the flanged portions thereof by means of a lap joint 12 or otherwise. While not illustrated and forming no part of the invention the joint between the parts of the ball may be suitably reinforced to prevent the ball when formed from collapsing.

In a suitable position, preferably that opposite the flanged portion thereof, one of the parts of the ball is formed with a depressed portion 13 made by any suitable tool and providing a socket 14 in the outer surface of this part of the ball. This, it will be noted, provides for a continuous, that is, uninterrupted and non-perforated wall. I also employ a spud. As illustrated this member is flanged, as indicated at 15 and the flange is of such dimensions as to fit within the socket 14. The body of the spud is indicated at 16 and is preferably tapped, as indicated at 17, for the reception of the screw threaded end of a rod, as designated at 18. The opposite end of this rod, as will be understood, is connected to the lever mechanism which operates the ball cock with which the float ball is associated. The invention also contemplates the use of a washer 19. This is made of metal and to conform with the inner surface of the wall of that part of the ball adjacent the depressed wall 13 and the socket 14, and in the washer there is a centrally disposed opening 20 adapted to receive the depressed wall 13. This washer 19 is made of a suitable metal preferably heavier than that of the ball, and, therefore, substantially unyielding and forming a support for the wall of the ball. It may conveniently be made of iron or steel, although of course the invention is not limited to this particular material. Likewise the parts of the ball may be made of copper and the spud made of brass, although these parts like the washer may be made of any suitable metal or other material.

The parts hereinbefore described are associated in the relationship clearly indicated in Fig. 3. The flanged portion of the spud is set in the socket and the washer is so placed that the depressed wall passes through the opening therein and the outer surface of the washer bears against the adjacent inner surface of the wall 10. With the parts in these positions they are connected in a suitable press or other tool which, as indicated in Fig. 3 provides an anular groove in the face of the wall 13 in a corresponding depressed portion in the inner face of the flanged portion of the spud. This inner part of the spud cooperating with the part of the washer which defines the opening therein causes the peripheral portion of the flange of the spud to spread over the adjacent portion of the washer with the adjacent portion of the depressed wall of the ball intervening, as indicated at 22. This operation, as will now be understood, permanently connects the spud to the wall of the ball in such a manner that the parts will not readily work loose and in any event in such a manner that the wall of the ball cannot leak.

I claim as my invention:

1. In a float ball, a wall having a socket formed therein, a spud in the said socket, and means for clamping the wall of the socket to the spud to secure the same in position therein.

2. In a float ball, a wall having a socket formed integrally therewith, a spud having a portion adapted to fit within the socket, and means for clamping the wall of the socket to the spud to secure the same in position therein.

3. In a float ball, a wall having a socket formed integrally therewith, a spud having a flange adapted to fit within the socket, and means for engaging the wall of the socket to secure the spud in position therein.

4. In a float ball, a wall having a depressed socket formed integrally therewith, a spud having a flange adapted to fit within the socket, and a washer fitting over the socket and adapted to engage the wall thereof to secure the spud in position therein.

5. In a float ball, a wall having a depressed socket formed integrally therewith, a spud having a flange adapted to fit in the socket, and a metal washer fitting over the socket, the parts being pressed together to cause the peripheral portion of the flange of the spud and the adjacent part of the wall of the socket to spread over the adjacent part of the washer.

Signed by me this 1st day of May, 1928.

HENRY J. KAST.